(12) United States Patent
Suga

(10) Patent No.: US 10,384,490 B2
(45) Date of Patent: Aug. 20, 2019

(54) PNEUMATIC TIRE

(71) Applicant: The Yokohama Rubber Co., LTD., Minato-ku, Tokyo (JP)

(72) Inventor: Yuuichi Suga, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 851 days.

(21) Appl. No.: 14/770,459

(22) PCT Filed: Feb. 25, 2014

(86) PCT No.: PCT/JP2014/054445
§ 371 (c)(1),
(2) Date: Aug. 25, 2015

(87) PCT Pub. No.: WO2014/129647
PCT Pub. Date: Aug. 28, 2014

(65) Prior Publication Data
US 2016/0009141 A1    Jan. 14, 2016

(30) Foreign Application Priority Data
Feb. 25, 2013    (JP) .................................. 2013-034303

(51) Int. Cl.
*B60C 11/00* (2006.01)
*B60C 11/03* (2006.01)
(Continued)

(52) U.S. Cl.
CPC ...... *B60C 11/0083* (2013.01); *B60C 11/0304* (2013.01); *B60C 11/04* (2013.01);
(Continued)

(58) Field of Classification Search
CPC ............. B60C 11/1376; B60C 11/0083; B60C 11/0304; B60C 11/04; B60C 11/11; B60C 2011/0369; B60C 2011/0353
See application file for complete search history.

(56) References Cited

U.S. PATENT DOCUMENTS 4,722,378 A * 2/1988 Carolla ............... B60C 11/0302
152/209.15
4,884,607 A * 12/1989 Mori ................... B60C 11/0302
152/209.18
(Continued)

FOREIGN PATENT DOCUMENTS

JP    S62-241709    10/1987
JP    H03-121905    5/1991
(Continued)

OTHER PUBLICATIONS

Machine translation of JP2002-316510 (no date).*
(Continued)

*Primary Examiner* — Steven D Maki
*Assistant Examiner* — Philip N Schwartz
(74) *Attorney, Agent, or Firm* — Thorpe North & Western

(57) ABSTRACT

A tread pattern of a pneumatic tire is provided with two outer circumferential main grooves, and at least one inner circumferential main groove provided between the outer circumferential main grooves. A tread profile line of a first land portion between the outer circumferential main grooves protrudes 1 mm or less with respect to a first arc shape formed so as to pass through edge ends on the respective inner sides of the outer circumferential main grooves and edge ends on both sides of the inner side circumferential main groove. Furthermore, a tread profile line of a second land portion on the outer side of the outer circumferential main grooves in a tire width direction protrudes 1 mm or less with respect to a second arc shape which passes through edge ends on the outer side of the outer circumferential main grooves.

18 Claims, 7 Drawing Sheets

(51) Int. Cl.
*B60C 11/13* (2006.01)
*B60C 11/04* (2006.01)
*B60C 11/11* (2006.01)

(52) U.S. Cl.
CPC ........... *B60C 11/11* (2013.01); *B60C 11/1376* (2013.01); *B60C 2011/0353* (2013.01); *B60C 2011/0369* (2013.01)

(56) References Cited

U.S. PATENT DOCUMENTS

2010/0212792 A1    8/2010    Mita
2011/0079334 A1*   4/2011    Bott ................... B60C 11/0302
                                                         152/209.14
2013/0092301 A1    4/2013    Ebiko
2013/0276949 A1    10/2013   Yano

FOREIGN PATENT DOCUMENTS

| | | |
|---|---|---|
| JP | H06-024210 | 2/1994 |
| JP | 2002316510 A * | 10/2002 |
| JP | 2004-122904 | 4/2004 |
| JP | 2009161001 A * | 7/2009 |
| JP | 2010-215221 | 9/2010 |
| JP | 2012-096656 | 5/2012 |
| JP | 2012-106608 | 6/2012 |
| WO | WO 2012/066714 | 5/2012 |
| WO | WO 2012/101993 | 8/2012 |

OTHER PUBLICATIONS

Machine translation of JP2009-161001 (no date).*
International Search Report for International Application No. PCT/JP2014/054445 dated May 27, 2014, 4 pages, Japan.

* cited by examiner

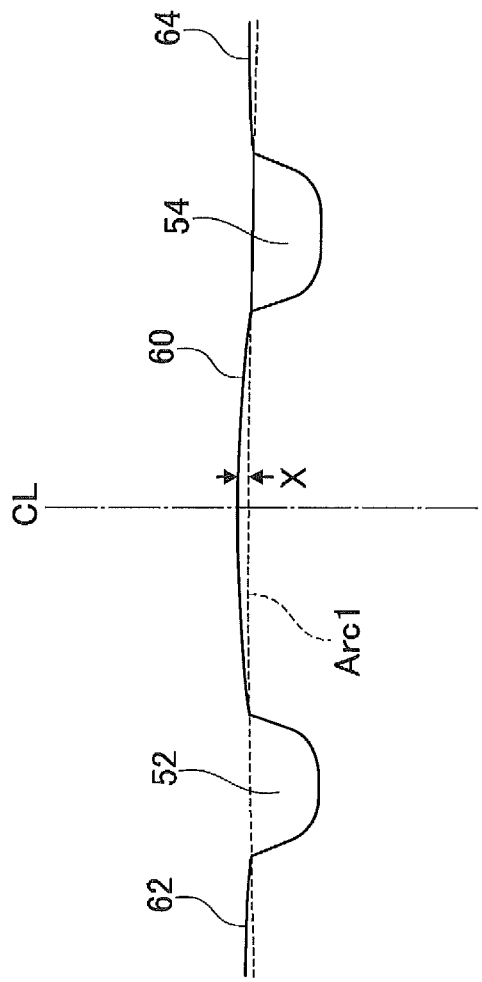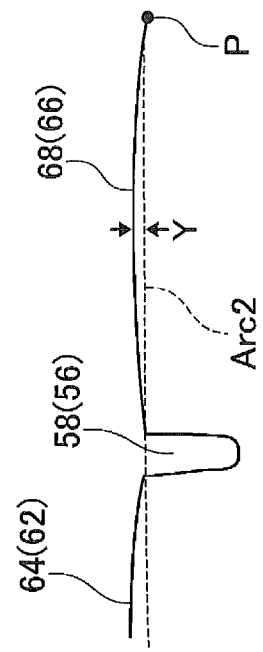
FIG. 4A
FIG. 4B

PNEUMATIC TIRE

TECHNICAL FIELD

The present technology relates to a pneumatic tire.

BACKGROUND ART

Due to increases in vehicle performance, there is currently a strong demand for pneumatic tires (hereinafter, referred to as "tires") which achieve both of steering stability on a dry road surface and steering stability on a wet road surface to a high degree when traveling at high speed. In particular, there is tendency to provide tires emphasizing steering stability in which a rib of a land portion interposed between tire circumferential main grooves is widened in order to increase the ground contact area which comes into contact with the ground.

The tire of Japanese Unexamined Patent Application Publication No. 2010-215221A is an example of a tire provided with a tread pattern having a widened rib. This tire achieves both of steering stability on a dry road surface and steering stability on a wet road surface to a high degree.

Specifically, this pneumatic tire has four main grooves extending straight in the tire circumferential direction in the ground contact region of the tread surface, and has five land portions defined by the main grooves on the tread surface.

A groove width of the main groove positioned on the outermost side of one side (hereinafter, referred to as "first side") in the tire width direction out of four main grooves is made narrower than a groove width of any of the groove widths of the other three main grooves, and a ratio Wmax/Wout of a maximum groove width Wmax of the three main grooves and a groove width Wout of the main groove positioned on the outermost side of the first side in the tire width direction is set within a range of 2.0 to 3.0.

Furthermore, only the land portion positioned on the outermost side of the first side in the tire width direction out of the five land portions is defined by inclined grooves arranged to be spaced at predetermined intervals in the tire circumferential direction to be formed into a row of blocks, and the other four land portions are formed into ribs which extend continuously in the tire circumferential direction.

A ratio Sin/Sout of a groove surface area ratio Sin of the other side (hereinafter, referred to as "second side") in the tire width direction centered on the tire equator in the ground contact region and a groove surface area ratio Sout of the first side in the tire width direction is set within a range of 1.25 to 1.35, and the groove surface area ratios of the ground contact regions of the three land portions, which exclude the land portion on the outermost side of the second side in the tire width direction and the land portion on the outermost side of the first side in the tire width direction out of the five land portions, are greater on the second side in the tire width direction than on the first side in the tire width direction with the respective centerlines of the land portions set as a border.

In the known pneumatic tire described above, it is possible to achieve both of steering stability on a dry road surface and steering stability on a wet road surface to a high degree; however, there is a demand for a further improvement in the steering stability on a dry road surface.

FIG. 7 is a diagram illustrating an example of a shape of a ground contact patch of the tire described above. In the ground contact patch of the tire described above, each of the ground contact lengths of the land portions, which are three ribs surrounded by four tire circumferential main grooves, are short, and the ground contact area is small. In particular, in the center land portion through which the centerline passes, the ground contact length of the central portion of the land portions is shorter compared to the periphery thereof, which causes a large decrease in the ground contact area. In addition, the ground contact area of a land portion of a shoulder region (region B) is also small.

Since the ground contact area is decreased due to the decrease in the ground contact length of each of the land portions by increasing the rib width of the land portion, the effect of improving the steering stability is easily suppressed. For this reason, there is a problem in that it is not possible to efficiently obtain improvements in the steering stability in tires with land portions having a large rib width.

SUMMARY

The present technology provides a pneumatic tire capable of improving steering stability on a dry road surface compared to the related art, even for tires having a wide rib in the land portions.

A pneumatic tire of one aspect of the present technology includes a tread portion having a tread pattern; a pair of bead portions; and a pair of side portions provided on both sides of the tread portion and connecting the pair of bead portions to the tread portion.

In each of half-tread regions on both sides in a tire width direction having a tire equator plane in the tread pattern interposed therebetween, the tread portion includes outer circumferential main grooves having a groove center position at a position separated from a tire equator plane by 30 to 35% of the tire ground contact width in a tire width direction and extending in the tire circumferential direction and at least one inner circumferential main groove provided between the outer circumferential main grooves and extending in the tire circumferential direction.

A first arc shape formed to pass through an edge adjoining a tread surface on an inner side of each of the outer circumferential main grooves in the tire width direction and edges adjoining the tread surface on both sides of the inner circumferential main groove, the first arc shape having a center point of a circle positioned on the tire equator plane, is determined, and a second arc shape passing through an edge adjoining the tread surface on an outer side in the tire width direction of each of the outer circumferential main grooves and connected with the first arc shape so as to be in contact therewith on the outer circumferential main groove, is determined.

At this time, a radius of a circle of the second arc shape is within a range of 75 to 95% of a radius of a circle of the first arc shape.

Tread profile lines of at least two first land portions positioned between the outer circumferential main grooves all protrude with respect to the first arc shape.

Tread profile lines of second land portions on outer sides of the outer circumferential main grooves in the tire width direction all protrude with respect to the second arc shape.

A protruding amount of the first land portion with respect to the first arc shape and a protruding amount of the profile line of the second land portion with respect to the second arc shape are both not more than 1.0 mm.

Of all of the circumferential main grooves provided in the tread portion and extending in the tire circumferential direction, the outer circumferential main grooves are preferably circumferential main grooves on the outermost side in the tire width direction.

It is preferable that the protruding amount of the profile line of each second land portion is increased further from the outer circumferential main grooves toward the outer side in the tire width direction and that the protruding amount is decreased after reaching a maximum protruding amount.

At that time, it is preferable that the profile line of each second land portion extend up to a position separated from a position having the maximum protruding amount in the tire width direction toward the outer side in the tire width direction by 5 to 15% of the tire maximum width.

It is preferable that a maximum protruding amount of the profile line of each second land portion be from 0.3 to 1.0 mm.

It is preferable that a maximum protruding amount of the profile line of the first land portion be from 0.2 to 0.5 mm.

In addition, of the outer circumferential main grooves, it is preferable that a groove width of a first outer circumferential main groove in a half-tread region on a first side which is one side in the tread width direction centered on the tire equator plane be narrow compared to a groove width of a second outer circumferential main groove in a half-tread region on a second side which is the other side in the tread width direction.

For the protruding amount of the profile line of the second land portions, it is preferable that the protruding amount on the first side be large compared to the protruding amount on the second side.

When mounting the pneumatic tire on a vehicle, it is preferable that a vehicle mounting orientation be specified for the pneumatic tire such that the first side is located on the outer side of the vehicle.

In addition, it is preferable that the inner circumferential main groove be provided in each half-tread region and that the inner circumferential main groove have a groove center position at a position separated from the tire equator plane by 10 to 15% of the tire ground contact width in the tire width direction.

Of the outer circumferential grooves and inner circumferential grooves, when an outer circumferential main groove and an inner circumferential groove positioned adjacent to each other on one side in the tire width direction are set as a first circumferential main groove and a second circumferential main groove, it is preferable that a ratio $W_2/W_1$ of a groove width $W_2$ of the second circumferential main groove with respect to a groove width $W_1$ of the first circumferential main groove be from 4 to 5.

Of all the circumferential main grooves provided in the tread portion and extending in the tire circumferential direction, it is preferable that the first circumferential main groove have the smallest groove width and the second circumferential main groove have the largest groove width.

In addition, it is preferable that the first land portion have a center land portion crossed by the tire equator plane and that the tread profile line of the center land portion protrudes with respect to the first arc shape.

With the pneumatic tire of the aspect described above, it is possible to improve steering stability (turning ability and straight-running ability) on a dry road surface compared to the related art, even for a tire having a wide rib in the land portions. Furthermore, it is possible to improve uneven wear of the tire.

BRIEF DESCRIPTION OF DRAWINGS

FIGS. 4A and 4B are diagrams illustrating a detailed comparison of a profile line of a land portion of the present embodiment and the first arc shape and the second arc shape.

DETAILED DESCRIPTION

A pneumatic tire of the present embodiment will be described. The pneumatic tire of the embodiment described below is applied, for example, to a tire for a passenger car, and may also be applied to a tire for a light truck or a tire for a bus and a truck. The pneumatic tire of the present embodiment that will be described below is a tire for a passenger car.

Note that in the description below, a tire width direction is a direction parallel to a rotational axis of the pneumatic tire. An outward side in the tire width direction is in a direction separating from a tire centerline CL which represents a tire equator plane in the tire width direction. Also, an inner side in the tire width direction is a side closer to the tire centerline CL in the tire width direction. A tire circumferential direction is a direction of rotation with a rotational axis of the pneumatic tire as a center of rotation. A tire radial direction is a direction orthogonal to the rotational axis of the pneumatic tire. An outer side in the tire radial direction is a side separating from the rotational axis. Similarly, an inner side in the tire radial direction is a side closer to the rotational axis.

In addition, the tire ground contact width, which will be described below, refers to the maximum linear distance in the tire width direction of a ground contact patch formed on a flat plate when a tire on a standard rim defined by ETRTO is inflated to an air pressure of, for example, 250 kPa, which corresponds to the maximum load capacity defined by ETRTO (European Tire and Rim Technical Organization), and placed on the flat plate in a stationary state and has a load equivalent to 80% of the maximum load capacity applied thereto. It is also possible to use JATMA (Japan Automobile Tire Manufacturers Association) or TRA (Tire and Rim Association) instead of ETRTO.

Tire Structure

Figure 1:
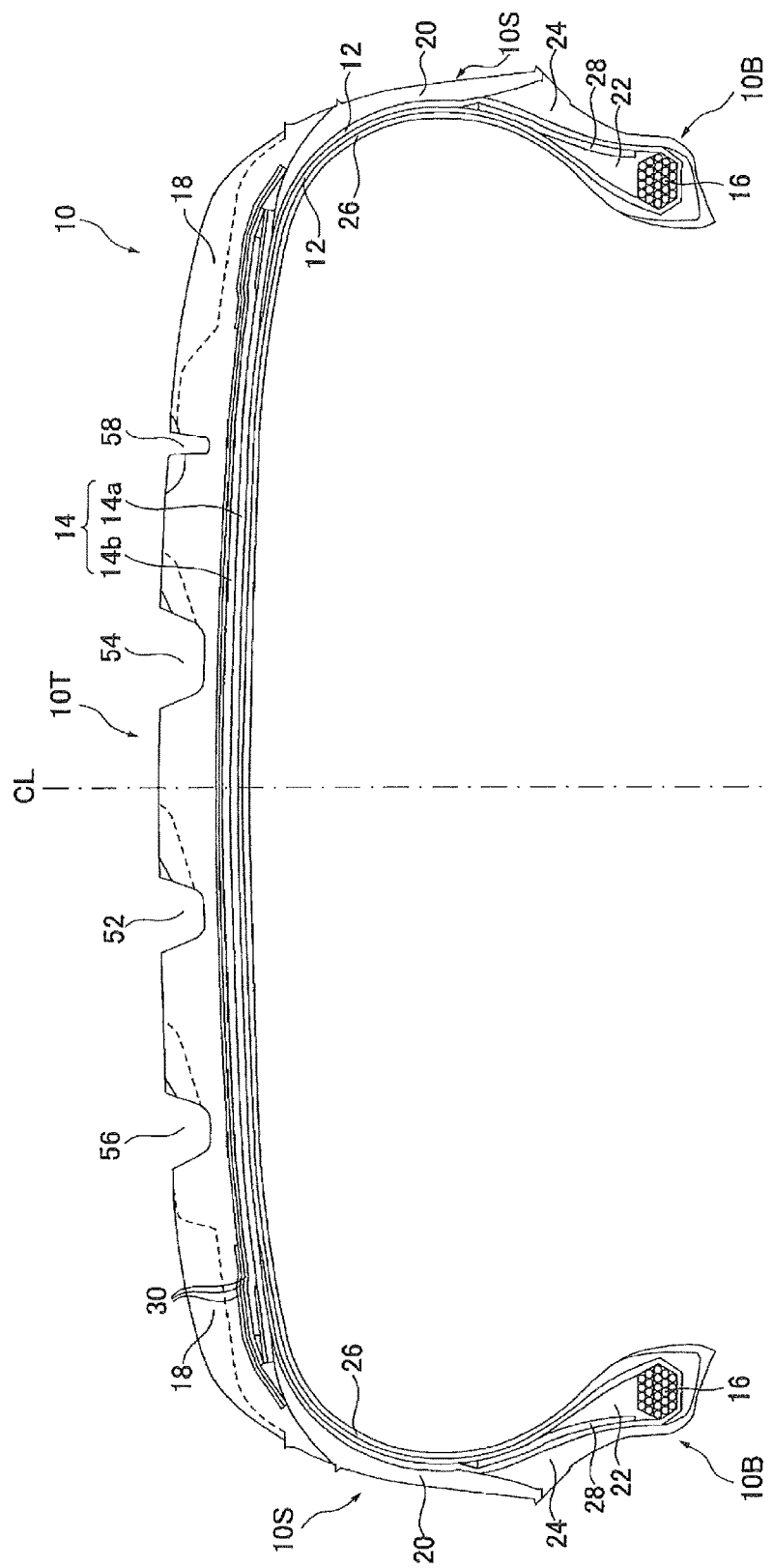
FIG. 1 is a tire profile cross-sectional view illustrating a cross section of a pneumatic tire of the present embodiment.

FIG. 1 is a profile cross-sectional view of a tire 10 of the present embodiment. The tire 10 includes a tread portion 10T having a tread pattern, a pair of bead portions 10B, and a pair of side portions 10S provided on both sides of the tread portion 10T, connecting the pair of bead portions 10B to the tread portion 10T.

The tire 10 mainly includes, as skeletal materials, a carcass ply layer 12, a belt layer 14, and a bead core 16, and, around these skeletal materials, a tread rubber member 18, a side rubber member 20, a bead filler rubber member 22, a rim cushion rubber member 24, and an inner liner rubber member 26.

The carcass ply layer 12 is constituted of a carcass ply member that is formed of organic fibers covered with rubber and that is wound between a pair of bead cores 16 of an annular shape so as to be formed into a toroidal shape. The carcass ply member is wound around the bead cores 16 and then extends to the inner side of a shoulder region of the tread rubber member 18 in the tire radial direction. The belt layer 14 is provided on the outer side in the tire radial direction of the carcass ply layer 12, and is constituted of two belt members 14a, 14b. The belt layer 14 is a member where rubber covers steel cords arranged inclined at a predetermined angle, for example, 20 to 30 degrees, with respect to the tire circumferential direction, and a width in the tire width direction of the belt member 14a that is a lower layer is longer than that of the belt member 14b that is the upper layer. The steel cords of the two-layer belt members 14a, 14b are inclined mutually in opposite direction. As such, the belt members 14a, 14b are crossing layers serving to suppress expansion of the carcass ply layer 12 due to inflated air pressure.

The tread rubber member 18 is provided on the outer side of the belt layer 14 in the tire radial direction. The tread rubber member 18 has both end portions thereof connected with the side rubber members 20, to thereby form side portions. The rim cushion rubber member 24 is provided at the end of the side rubber member 20 on the inner side in the tire radial direction, and comes into contact with a rim on which the tire 10 is mounted. The bead filler rubber member 22 is provided on the outer side of the bead core 16 in the tire radial direction so as to be interposed between a portion of the carcass ply layer 12 prior to being wound around the bead core 16 and a wound portion of the carcass ply layer 12 wound around the bead core 16. The inner liner rubber member 26 is provided on an inner surface of the tire 10 facing a tire cavity region that is filled with air and is surrounded by the tire 10 and the rim.

Additionally, the tire 10 is provided with a bead stiffener 28 between the carcass ply layer 12 wound around the bead core 16 and the bead filler rubber member 22 and is further provided with three layers of a belt cover layer 30 that is formed of organic fibers covered with rubber and that covers the belt layer 14 from the outward side of the belt layer 14 in the tire radial direction.

The tire 10 has such a tire structure, but the structure of the pneumatic tire according to the present technology is not limited to the tire structure illustrated in FIG. 1.

Tread Pattern

Figure 2:
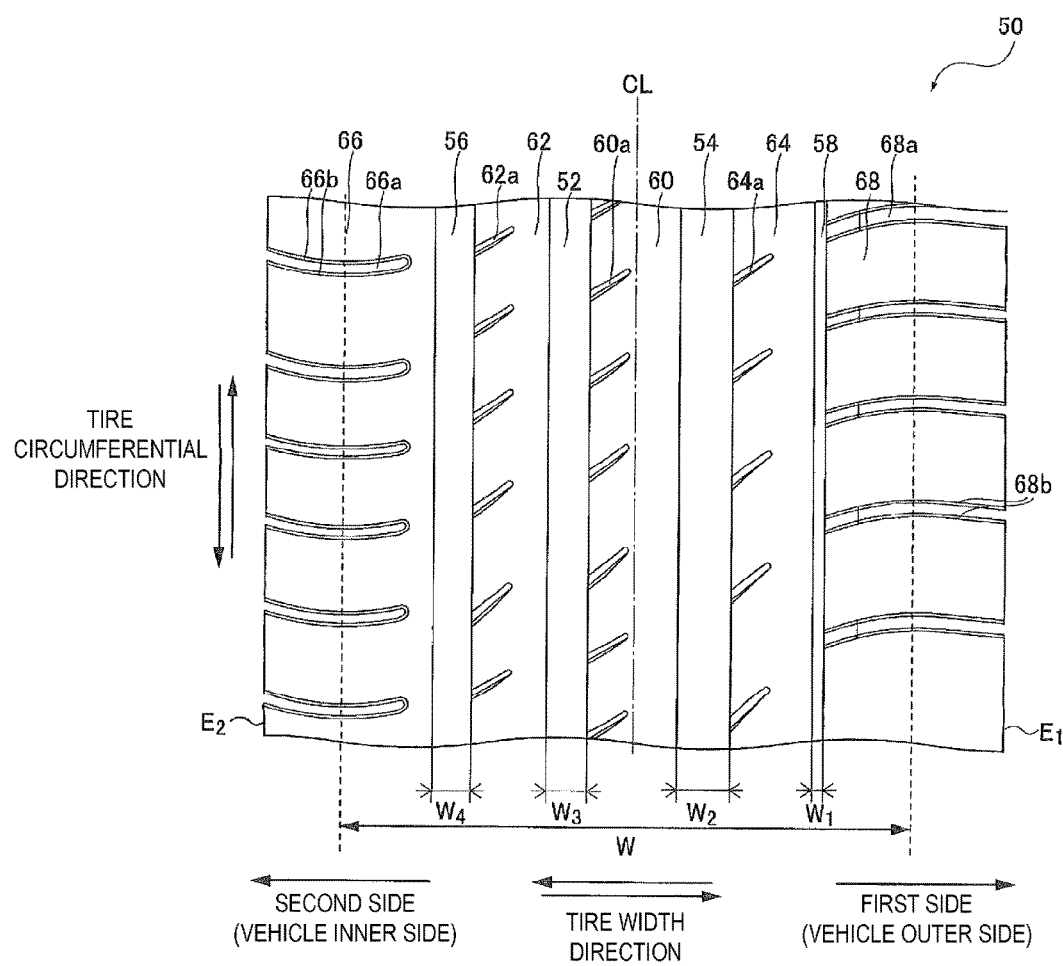
FIG. 2 is a developed plan view illustrating an example of a tread pattern of the pneumatic tire illustrated in FIG. 1.

A tread pattern 50 is formed in a region on a tread surface of the tire 10. FIG. 2 is a developed pattern view of an example in which a portion on a tire circumference of the tread pattern 50 formed in the region on the tread surface of the tire 10 illustrated in FIG. 1 is developed on a plane.

The tread pattern 50 has four circumferential main grooves 52, 54, 56, 58 and five land portions 60, 62, 64, 66, 68 defined by the circumferential main grooves 52, 54, 56, 58. The circumferential main grooves 58, 54, 52, 56 are respectively a first, a second, a third, and a fourth circumferential main groove when viewed from a first side. In addition, the circumferential main grooves 56, 58 are outer circumferential main grooves, and the circumferential main grooves 52, 54 are inner circumferential main grooves. In the present embodiment, two circumferential main grooves 52, 54 are provided as inner circumferential main grooves; however, only one circumferential main groove may be provided, or three circumferential main grooves may be provided. However, in order to improve the steering stability, it is preferable to have one or two inner circumferential main grooves in terms of providing a tire having a wide rib in the land portions. In a case where there is one inner circumferential main groove, the inner circumferential main groove may be provided on the tire centerline CL; however, the position of the inner circumferential main groove in the tire width direction is preferably offset from the tire centerline CL in terms of improving the steering stability. In such a case, it is preferable that information specifying the vehicle mounting orientation be displayed on the tire side wall to specify that, when mounting the tire 10 on the vehicle, the tire 10 is mounted so that the inner circumferential main groove is positioned on the inner side of the vehicle viewed from the tire centerline CL. The tire centerline CL is a line on the tread surface where the tire equator plane intersects with the tread surface.

The circumferential main grooves 58, 56 have groove center positions which are away from the tire centerline CL (a line on the tread surface on the tire equator plane) by 30 to 35% of a tire ground contact width W in the tire width direction in each of the half tread regions on both sides in the tire width direction interposing the tire equator plane (the tire centerline CL in FIG. 2) of the tread pattern 50. The circumferential main grooves 54, 52 are provided between the circumferential main grooves 58, 56 extending in the tire circumferential direction. Accordingly, the circumferential main grooves 56, 58 are outer circumferential main grooves, and the circumferential main grooves 52, 54 are inner circumferential main grooves. It is preferable that the circumferential main grooves 56, 58 be the circumferential main grooves located on the outermost side in the tire width direction out of all of the circumferential main grooves provided on the tread portion and extending in the tire circumferential direction.

The tire centerline CL passes through a region of the land portion 60. Of the first side and the second side having the tire centerline CL interposed therebetween, land portions 64, 68 are provided on the first side, and land portions 62, 66 are provided on the second side. The land portions 68, 64, 60, 62, 66 are, in order, a first, a second, a third, a fourth, and a fifth land portion when viewed from the first side.

The groove center positions of the circumferential main grooves 52, 54 are not particularly limited. However, considering that the centers of the circumferential main grooves 56, 58 are positioned in a range spaced by 30 to 35% of the tire ground contact width W from the tire centerline CL, it is preferable that the circumferential main grooves 52, 54 are formed so that the groove centers of the circumferential main grooves 52, 54 are positioned in a range spaced by 10 to 15% of the tire ground contact width from the tire centerline CL (equator plane) interposing the tire centerline CL therebetween, in terms of improving the steering stability by increasing the rib width.

The land portion 60 is a portion which is formed interposed between the circumferential main groove 52 and the circumferential main groove 54 and comes into contact with the ground. In the region of the land portion 60, a plurality of inclined grooves 60a extending in the tire width direction from the circumferential main groove 52 positioned on the second side toward the first side are provided at predetermined intervals in the tire circumferential direction. The inclined grooves 60a extend from the circumferential main groove 52 in a direction inclined with respect to the tire width direction and are closed mid-way in the region of the land portion 60 without communicating to the circumferential main groove 54. An inclination angle of the inclined groove 60a with respect to the tire width direction is, for example, from 20 to 50 degrees. Accordingly, the land portion 60 forms a continuous land portion (rib) where the land portion is continuously connected in the tire circumferential direction.

The land portion 62 is a portion which is formed interposed between the circumferential main groove 56 and the circumferential main groove 52 and which comes into contact with the ground. In a region of the land portion 62, a plurality of inclined grooves 62a extending in the tire width direction from the circumferential main groove 56 positioned on the second side toward the first side are provided at predetermined intervals in the tire circumferential direction. The inclined grooves 62a extend from the circumferential main groove 56 in a direction (the same direction as the inclination direction of the inclined grooves 60a) inclined with respect to the tire width direction and are closed mid-way in the region of the land portion 62 without communicating to the circumferential main groove 52. An inclination angle with respect to the tire width direction of the inclined groove 62a is, for example, from 20 to 50 degrees. Accordingly, the land portion 62 forms a continuous land portion (rib) where the land portion is continuously connected in the tire circumferential direction.

The land portion 64 is a portion which is formed interposed between the circumferential main groove 54 and the circumferential main groove 58 and which comes into contact with the ground. In a region of the land portion 64, a plurality of inclined grooves 64a extending from the circumferential main groove 54 toward the first side in a direction (the same direction as the inclination direction of the inclined grooves 60a) inclined with respect to the tire width direction are provided at predetermined intervals in the tire circumferential direction. The inclined grooves 64a are closed mid-way in the region of the land portion 64 without communicating to the circumferential main groove 58 from the circumferential main groove 54. An inclination angle of the inclined groove 64a with respect to the tire width direction is, for example, from 20 to 55 degrees. Accordingly, the land portion 64 forms a continuous land portion (rib) where the land portion is continuously connected in the tire circumferential direction.

The land portion 66 is provided between the circumferential main groove 56 and a pattern end $E_2$. In a region of the land portion 66, a plurality of shoulder inclined grooves 66a are provided at predetermined intervals in the tire circumferential direction. Each of the shoulder inclined grooves 66a extends in the tire width direction from the pattern end $E_2$ toward the first side; however, the shoulder inclined grooves 66a are closed mid-way in the region of the land portion 66 without being opened to the circumferential main groove 56. Accordingly, the land portion 66 forms a continuous land portion where the land portion is continuously connected in the tire circumferential direction. On the circumference of the shoulder inclined grooves 66a, chamfers 66b are provided so as to cover the entire circumference.

The land portion 68 is provided between the circumferential main groove 58 and a pattern end $E_1$. In a region of the land portion 68, a plurality of shoulder inclined grooves 68a are provided at predetermined intervals in the tire circumferential direction. Each of the shoulder inclined grooves 68a extends in the tire width direction from the pattern end $E_1$ toward the second side and is opened to the circumferential main groove 58. Accordingly, the land portion 68 is defined in the tire circumferential direction by the shoulder inclined grooves 68a to be formed into a row of blocks where the land portions are discontinuously formed in the tire circumferential direction. Chamfers 68b are provided at the periphery of the shoulder inclined grooves 68a.

When the groove width of the circumferential main groove 58 is $W_1$, the groove width of the circumferential main groove 54 is $W_2$, the groove width of the circumferential main groove 52 is $W_3$, and the groove width of the circumferential main groove 56 is $W_4$, it is preferable that the groove width $W_1$ be the smallest out of the groove widths $W_1$ to $W_4$ and the groove width $W_2$ be the largest. That is, out of the circumferential main grooves 52, 54, 56, 58, it is preferable that the circumferential main groove 58 have the smallest groove width and the circumferential main groove 54 have the largest groove width.

At this time, the ratio $W_2/W_1$ of the groove width $W_1$ and the groove width $W_2$ is preferably from 4 to 5. That is, out of the outer circumferential grooves and the inner circumferential grooves, the ratio $W_2/W_1$ of the groove widths of the outer circumferential main groove 58 and the inner circumferential main groove 54 which are positioned adjacent to each other on one side in the tire width direction is preferably from 4 to 5. Furthermore, in the tread pattern 50, as viewed from the tire centerline CL, when the groove surface area ratio of the region on the first side is $S_{out}$, and the groove surface area ratio of the region on the second side is $S_{in}$, the ratio $S_{in}/S_{out}$ is preferably from 1.1 to 1.2.

Determining each of the ratio $W_2/W_1$ and the ratio $S_{in}/S_{out}$ of the tread pattern 50 in the ranges described above in this manner can improve one of steering stability on a dry road surface and steering stability on a wet road surface while maintaining the other, and can suppress uneven wear.

Note that it is preferable that the average groove interval of the inclined grooves 68a defining the land portion 68, which is a shoulder land portion, in the tire circumferential direction be long compared to the average groove interval of the inclined grooves 66a defining the land portion 66, which is a shoulder land portion on the second side, in the tire circumferential direction in terms of achieving both of steering stability on a dry road surface and a wet road surface for the tire 10. Regarding a slip angle between the tire 10 and the ground surface, when the tire 10 undergoes cornering such that the region on the first side of the region of the tread surface is located on the outer side of the cornering, the region on the first side is subjected to a high load due to the load movement. In particular, the ground contact pressure on the land portion 68 is high and the land portion 68 receives a large lateral force from the ground surface. The average groove interval is increased compared to the land portion 66 to increase the block rigidity of the land portion 68 so that the land portion 68 can withstand the large lateral force. At this time, because the tire 10 is mounted on the vehicle so that the land portion 66 is positioned on the inner side of the vehicle, the land portion 66 does not receive a large lateral force from the ground surface compared to the land portion 68. The average groove interval of the inclined grooves refers to the length obtained by dividing the tire circumferential length of the land portions 66, 68 by the total number of the inclined grooves 66a, 68a. The average groove interval of the inclined grooves 68a is preferably from 1.15 times to 1.25 times the average groove interval of the inclined grooves 66a.

In the present embodiment, the tread profile line will be described below assuming the tread pattern illustrated in FIG. 2; however, the tread pattern is not limited to the tread pattern illustrated in FIG. 2. The tread pattern illustrated in FIG. 2 is merely an example.

Tread Profile Line

Figure 3:
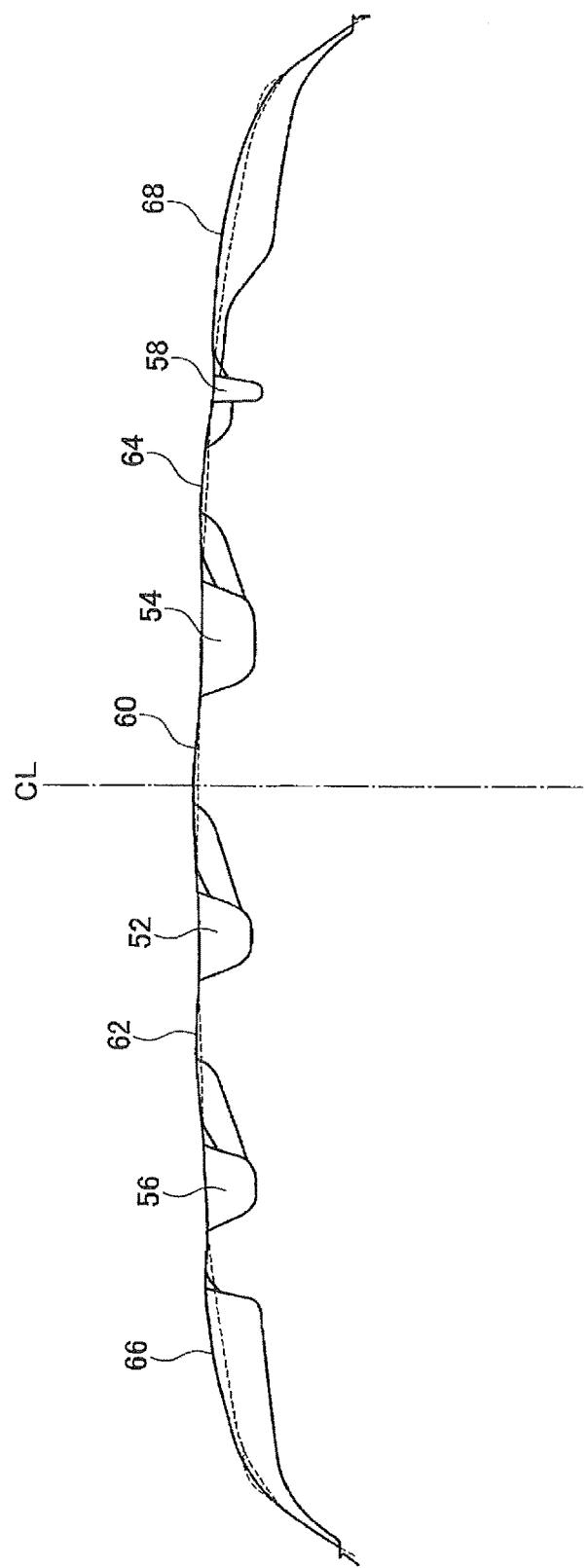
FIG. 3 is a diagram illustrating an example (a solid line) of a tread profile line of the present embodiment and an example (a dotted line) of a first arc shape and a second arc shape for comparison with this tread profile line.

The tread profile line of the tread pattern 50 described above is formed as illustrated in FIG. 3. FIG. 3 is a diagram illustrating an example (a solid line) of the tread profile line of the present embodiment and an example (a dotted line) of a first arc shape and a second arc shape for comparison with this tread profile line. FIGS. 4A and 4B are diagrams illustrating detailed comparisons of the profile line of a land portion of the present embodiment and a first arc shape Arc1 and a second arc shape Arc2.

As illustrated in FIG. 3, the tread profile lines of the land portions 60, 62, 64 which are first land portions protrude at all positions excluding the edge ends (positions where the circumferential main grooves come into contact with the land portions) of each of the land portions with respect to the first arc shape Arc1 to be described below. Furthermore, the tread profile lines of the land portions 66, 68 which are second land portions protrude at positions excluding the edge ends (positions where the circumferential main grooves come into contact with the land portions) with respect to the second arc shape Arc2 to be described below. The protruding amounts of the land portions 60, 62, 64 and the land portions 66, 68 are all not more than 1 mm.

Specifically, the tread profile lines of the land portions 60, 62, 64 pass through edge ends of both sides where the circumferential main grooves come into contact with the land portions and are preferably formed by an arc with a curvature radius smaller than the curvature radius of the first arc shape Arc1. For the maximum protruding amount of the profile lines of the land portions 60, 62, 64 with respect to the first arc shape Arc1, it is preferable that X illustrated in FIG. 4A be from 0.2 to 0.5 mm in terms of suppressing the uneven wear and improving the steering stability. More preferably, X is from 0.2 to 0.4 mm. In the present embodiment, the profile lines of the land portions 60, 62, 64 all protrude with respect to the first arc shape Arc1; however, the profile lines of the land portions 60, 62, 64 need not all protrude with respect to the first arc shape Arc1. Only the profile line of the land portion 60 positioned between the circumferential main grooves 52, 54 which are inner circumferential main grooves may protrude with respect to the first arc shape Arc1. That is, by the tread profile line of the land portion 60 which is the center land portion crossing over the tire equator plane protruding with respect to the first arc shape Arc1, it is possible to suppress decreases in the ground contact length of a central portion in the center land portion passing through the tire equator plane.

In addition, the tread profile lines of the land portions 66, 68 pass through edge ends on the outer side of the circumferential main grooves 56, 58 in the tire width direction where the circumferential main grooves come into contact with the land portions and are formed by an arc with a curvature radius smaller than the curvature radius of the second arc shape Arc2. For the maximum protruding amount of the land portions 66, 68, Y illustrated in FIG. 4B is preferably from 0.3 to 1 mm in terms of suppressing the uneven wear and improving the steering stability. More preferably, Y is from 0.5 to 0.7 mm. Here, it is preferable that the protruding amount of the tread profile lines of the land portions 66, 68 with respect to the second arc shape Arc2 be increased from the circumferential main groove toward the outer side in the tire width direction and that the protruding amount decrease after reaching the maximum protruding amount. In such a case, it is preferable that the tread profile lines of the land portions 66, 68 extend up to a point P on the tread surface of the land portions 66, 68, which is a position separated from the position having the maximum protruding amount in the tire width direction toward the outer side in the tire width direction along the tire width direction by 5 to 15% of the tire maximum width. Here, the tire maximum width is the maximum width of a tire when the tire on a standard rim defined by ETRTO is inflated to an air pressure which corresponds to the maximum load capacity defined by ETRTO.

The position of the maximum protruding amount described above in the tire width direction is preferably separated from the tire equator plane by 65 to 75% of half of the tire maximum width described above.

First Arc Shape Arc1 and Second Arc Shape Arc2

Figure 5:
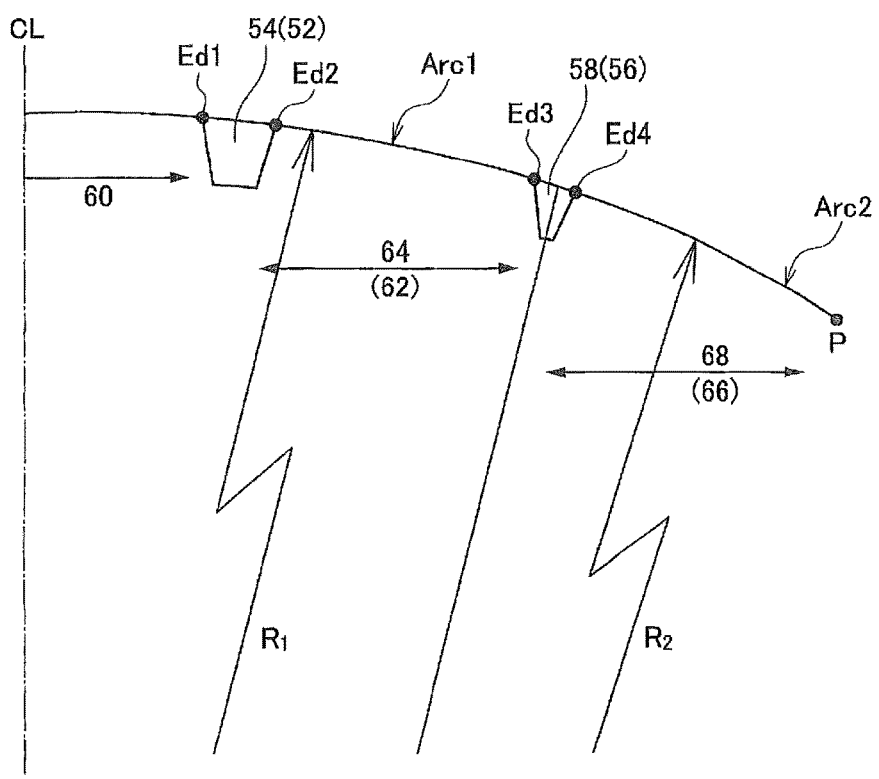
FIG. 5 is an explanatory diagram schematically illustrating the first arc shape and the second arc shape.

FIG. 5 is a diagram schematically illustrating the first arc shape Arc1 and the second arc shape Arc2 so as to be easily understood. In the following, as illustrated in FIG. 5, description will be given of a half-tread region which is the right half portion across the tire centerline CL. For a half-tread region which is the left half portion, the reference numerals of corresponding portions are described in parentheses.

The first arc shape Arc1 is an arc shape with a radius $R_1$ which is formed so as to pass through an edge end Ed3 on the inner side of the circumferential main groove 58 (56) which is the outer circumferential main groove and edge ends Ed1, Ed2 on both sides of the circumferential main groove 54 which is the inner circumferential main groove, and where the center point is on the tire centerline CL (tire equator plane). This arc shape is the same as the arc shape of the half-tread region which is the left half portion.

The second arc shape Arc2 passes through an edge end Ed4 on the outer side of the circumferential main groove 58 (56), which is the outer circumferential main groove, in the tire width direction which comes into contact with the tread surface and is connected with the first arc shape Arc1 so as to come into contact with the first arc shape Arc1 on the circumferential main groove 58 (56). Such a second arc shape preferably extends up to the point P. At this time, setting the radius $R_2$ of the second arc shape Arc2 within a range of 75 to 95% of the radius $R_1$ of the first arc shape Arc1 can improve the steering stability (turning ability and straight-running ability) as described below.

The shapes of the first arc shape Arc1 and the second arc shape Arc2 are references to be compared with the profile lines of the land portions 60, 62, 64, 66; however, errors within a range of less than 0.2 mm may be tolerated in these shapes.

In this manner, in the present embodiment, setting the protruding amount of the profile lines of the land portions (the first land portions) 60, 62, 64 and the land portions (the second land portions) 66, 68 with respect to the first arc shape Arc1 or the second arc shape Arc2 to not more than 1.0 mm can improve steering stability (turning ability and straight-running ability) as described below.

In particular, setting the protruding amount of the land portions (the first land portions) 60, 62, 64 to from 0.2 to 0.5 mm can improve the steering stability (turning ability and straight-running ability) and can suppress uneven wear as described below. When the protruding amount described above is smaller than 0.2 mm, the increase in the ground contact area is small and the improvement in the steering stability is small. When the protruding amount described above is larger than 0.5 mm, the land portions 60, 62, 64 in the center region are significantly worn and the uneven wear increases.

In addition, setting the protruding amount of the land portions (the second land portions) 66, 68 to from 0.3 to 1.0 mm can improve the steering stability (turning ability and straight-running ability) and can suppress uneven wear as described below. When the protruding amount described above is smaller than 0.3 mm, the increase in the ground contact area is small and the improvement in the steering stability is small. When the protruding amount described above is larger than 1.0 mm, the wear of the shoulder region increases and the uneven wear increases due to the ground contact length of the land portions 66, 68 of the shoulder region being increased.

In addition, it is preferable that the protruding amount of the profile lines of the land portions (the second land portions) 66, 68 with respect to the second arc shape Arc2 be increased from the circumferential main grooves 56, 58 toward the outer side in the tire width direction and be decreased after reaching the maximum protruding amount, in terms of forming a smooth tread profile line and improving the steering stability (turning ability). In particular, it is more preferable that the protruding amount be decreased up to the point P which is a position separated from the position of the maximum protruding amount in the tire width direction toward the outer side in the tire width direction by 5 to 15% of the tire maximum width. That is, the second arc shape Arc2 is preferably a shape extending up to the position of point P described above from the edge end on the outer side of the circumferential main grooves 56, 58 in the tire width direction.

In addition, the tire 10 may have the following preferable form.

Specifically, out of the circumferential main grooves 56, 58 which are the outer side circumferential main grooves, the groove width of the circumferential main groove (the first circumferential main groove) 58 in the half-tread region on the first side (see FIG. 2) which is one side in the tread width direction is narrow compared to the groove width of the circumferential main groove 56 in the half-tread region on the second side (see FIG. 2) and, for the protruding amounts of the profile lines of the land portions 66, 68 which are the second land portions, it is preferable that the protruding amount of the land portion 68 positioned on the first side be large compared to the protruding amount of the land portion 66 on the second side. In this manner, making the above-described protruding amounts of the land portions 66, 68 in the shoulder regions different from each other can suppress decreases in the ground contact area of the land portion 68 positioned on the outer side of the vehicle having a camber angle.

When mounting the tire 10 on the vehicle, the vehicle mounting orientation of the tire 10 is preferably specified such that the first side (see FIG. 2) where the circumferential main groove 58 is provided is on the outer side of the vehicle. The vehicle mounting orientation is displayed using marks, reference numerals, or characters on the tire side wall. It is possible to find the information regarding the vehicle mounting orientation from the specified information. In such a case, it is preferable that the protruding amount of the land portion 68 in the shoulder region corresponding to the outer side of the vehicle be large compared to the protruding amount of the land portion 66 in the shoulder region corresponding to the inner side of the vehicle in consideration of the camber angle of the vehicle.

In addition, because the groove width of the circumferential main groove 58 is narrow compared to the other circumferential main grooves, there may be a case where it is not possible to secure the desired ground contact area of the land portion 68 due to the influence of the molding die during vulcanization at the time of manufacturing the tire. For this reason, it is preferable that the protruding amount of the land portion 68 be large compared to the land portion 66.

Figure 6:
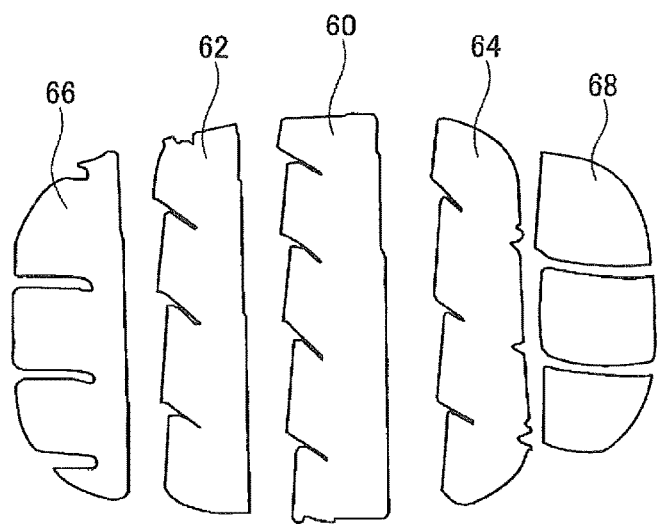
FIG. 6 is a diagram illustrating an example of a ground contact shape of the pneumatic tire of the present embodiment.
Figure 7:
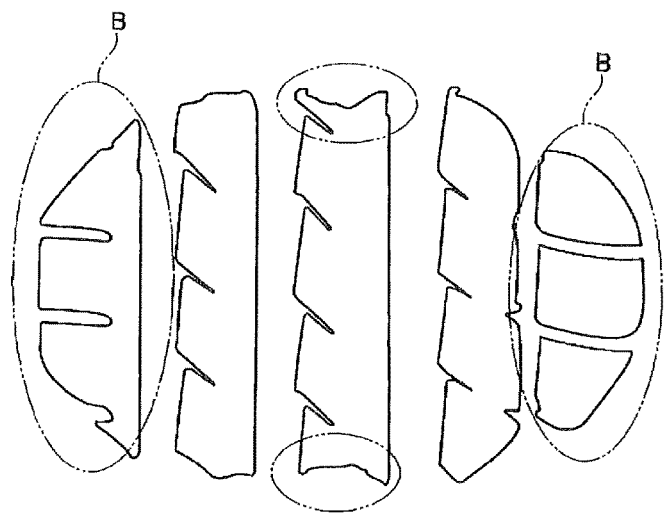
FIG. 7 is a diagram illustrating an example of a ground contact shape of a conventional tire.

FIG. 6 is a diagram illustrating an example of the ground contact shape of the tire 10, which has the same tread pattern as in FIG. 7, but the tread profile lines of the land portions 60, 62, 64, 66, 68 have lines as illustrated in FIG. 3, FIGS. 4A and 4B. The ground contact shape illustrated in FIG. 6 is measured under the same conditions as the conventional tire illustrated in FIG. 7. The conventional tire is provided with the first arc shape Arc1 and the second arc shape Arc2 as the tread profile line of the land portions.

As is understood from a comparison of the ground contact shapes illustrated in FIG. 6 and FIG. 7, it is understood that the ground contact area is increased by the ground contact length of the land portion 60 of the tire 10 illustrated in FIG. 6 being increased and that the ground contact area is also increased of the land portions 66, 68 in the shoulder regions of the tire 10.

Working Examples

To confirm effects of the tire 10 of the present embodiment, a tire was manufactured and mounted on a vehicle, and a running test for steering stability on the dry road surface and a wear test for evaluating uneven wear resistance were conducted. A tire size of the tire used is 245/40ZR18.

As the structure of the tires of Working Examples 1 to 11, Conventional Example, and Comparative Examples 1 to 4 described below, the structure illustrated in FIG. 1 was used, the pattern illustrated in FIG. 2 was used as the tread pattern, and the tread profile lines of the land portions 60, 62, 64, 66, 68 were variously changed.

In Conventional Example, the first arc shape Arc1 (radius $R_1$ 350 mm) and the second arc shape Arc2 (radius $R_2$ 300 mm) were set as the tread profile lines of the land portions 60, 62, 64, 66, 68.

In Working Examples 1 to 5 and Comparative Example 1, the protruding amounts of the land portions 60, 62, 64 were variously changed with respect to the first arc shape Arc1 (radius $R_1$ 350 mm) used in Conventional Example. Meanwhile, in Working Examples 1 to 5 and Comparative Example 1, the protruding amounts of the land portions 66, 68 were fixed at 0.3 mm with respect to the second arc shape Arc2 (radius $R_2$ 300 mm) used in Conventional Example.

In Working Examples 6 to 9 and Comparative Example 2, the protruding amounts of the land portions 60, 62, 64 were fixed at 0.5 mm with respect to the first arc shape Arc1 (radius $R_1$ 350 mm) used in Conventional Example and the protruding amounts of the land portions 66, 68 with respect to the second arc shape Arc2 (radius $R_2$ 300 mm) used in Conventional Example were variously changed.

In Working Examples 10 and 11 and Comparative Examples 3 and 4, the protruding amounts of the land portions 60, 62, 64 were fixed at 0.3 mm and the protruding amounts of the land portions 66, 68 were fixed at 0.7 mm. Meanwhile, in a state where the radius $R_1$ 350 mm of the first arc shape Arc1 was fixed, the radius $R_2$ of the second arc shape Arc2 was changed. The second arc shape Arc2 extends up to the point P described above.

Steering Stability Test

Each tire was mounted on a rim (18×8.5 JJ), inflated to an air pressure of 230 kPa, and mounted on front and rear wheels of a vehicle (displacement 2000 cc). An experienced test driver performed sensory evaluation by driving the vehicle on a test course consisting of a dry asphalt road surface while changing speed within a range of 0 to 200 km/h. The sensory evaluation is a relative evaluation with Conventional Example as a standard (index 100). A higher index indicates more superior steering stability. The steering stability was evaluated by being divided into turning performance and straight running performance. The turning performance is an evaluation of the drivability and the stability of the vehicle when the vehicle turns with a radius of 30 m, and the straight running performance is an evaluation of the steering responsive feel when the vehicle travels straight, the responsiveness of the vehicle immediately after starting steering with the steering wheel, and the follow-up ability of the turning of the vehicle with respect to the steering of the steering wheel.

Uneven Wear Test

Each tire was mounted on a rim (18×8.5 JJ), inflated to an air pressure of 230 kPa, and mounted on front and rear wheels of a vehicle (displacement 2000 cc). Then, the vehicle traveled 10000 km at a predetermined speed of 80 km/h on a predetermined road surface, the wear amount of the land portion 60 in the center region and the wear amount of the land portions 66, 68 in the shoulder regions after the traveling were measured, the ratio of the wear amounts was calculated as the uneven wear ratio and set as an index on the basis of Conventional Example (index 100). A higher index indicates a better uneven wear resistance.

In the following Table 1 and Table 2, the specifications of Working Examples 1 to 11, Conventional Example, and Comparative Examples 1 to 4 are shown with the evaluation results thereof.

TABLE 1

|  | Conventional Example | Working Example 1 | Working Example 2 | Working Example 3 | Working Example 4 | Working Example 5 |
|---|---|---|---|---|---|---|
| Protruding amounts of land portions 60, 62, 64 (mm) | 0.0 | 0.1 | 0.2 | 0.3 | 0.5 | 0.7 |
| Protruding amounts of land portions 66, 68 (mm) First side/Second side | 0.0/0.0 | 0.3/0.3 | 0.3/0.3 | 0.3/0.3 | 0.3/0.3 | 0.3/0.3 |
| Steering stability (Straight-running ability) | 100 | 100 | 103 | 105 | 105 | 107 |
| Steering stability (Turning ability) | 100 | 105 | 105 | 105 | 105 | 105 |
| Uneven wear resistance | 100 | 103 | 103 | 103 | 102 | 100 |

|  | Comparative Example 1 | Working Example 6 | Working Example 7 | Working Example 8 | Working Example 9 | Comparative Example 2 |
|---|---|---|---|---|---|---|
| Protruding amounts of land portions 60, 62, 64 (mm) | 1.2 | 0.5 | 0.5 | 0.5 | 0.5 | 0.5 |
| Protruding amounts of land portions 66, 68 (mm) First side/Second side | 0.3/0.3 | 0.5/0.5 | 0.7/0.7 | 1.0/1.0 | 1.0/0.7 | 1.2/1.2 |
| Steering stability (Straight-running ability) | 110 | 105 | 105 | 105 | 105 | 105 |
| Steering stability (Turning ability) | 105 | 107 | 108 | 109 | 110 | 110 |
| Uneven wear resistance | 95 | 103 | 105 | 110 | 110 | 95 |

TABLE 2

|  | Working Example 10 | Working Example 11 | Comparative Example 3 | Comparative Example 4 |
|---|---|---|---|---|
| Protruding amounts of land portions 60, 62, 64 (mm) | 0.3 | 0.3 | 0.3 | 0.3 |
| Protruding amounts of land portions 66, 68 (mm) First side/Second side | 0.7/0.7 | 0.7/0.7 | 0.7/0.7 | 0.7/0.7 |
| Second arc shape radius $R_2$/First arc shape radius $R_1$ (%) | 75 | 95 | 70 | 100 |

TABLE 2-continued

|  | Working Example 10 | Working Example 11 | Comparative Example 3 | Comparative Example 4 |
|---|---|---|---|---|
| Ground contact area | 100 | 103 | 95 | 98 |
| Steering stability (Straight-running ability) | 105 | 105 | 95 | 95 |
| Steering stability (Turning ability) | 105 | 105 | 98 | 97 |
| Uneven wear resistance | 103 | 105 | 100 | 100 |

With respect to Conventional Example shown in Table 1, in Working Examples 1 to 9, it is possible to improve the turning ability while maintaining or improving the straight running ability of the steering stability. In addition, according to the comparison of Working Examples 1 to 5 and Comparative Example 1, the protruding amounts of the land portions 60, 62, 64 are preferably from 0.2 to 0.5 mm in terms of improving the straight-running ability and the uneven wear resistance. In addition, according to the comparison of Working Example 4, Working Examples 6 to 9, and Comparative Example 2, the protruding amounts of the land portions 66, 68 are preferably from 0.3 to 1.0 mm in terms of improving the uneven wear resistance.

In addition, according to the comparison of Working Examples 8, 9, in terms of improving the turning ability, it is preferable that the protruding amount of the land portion 68 on the first side (the outer side when mounted on the vehicle) be large compared to the protruding amount of the land portion 66 on the second side (the inner side when mounted on the vehicle).

According to the comparison of Working Examples 10, 11 and Comparative Examples 3, 4 illustrated in FIG. 2, setting the radius $R_2$ of the second arc shape Arc2 to from 75 to 95% of the radius $R_1$ of the first arc shape Arc1 can improve the steering stability (the turning ability and the straight-running ability).

The pneumatic tire of the present technology has been described in detail above. However, it should be understood that the present technology is not limited to the above embodiments, but may be improved or modified in various ways so long as these improvements or modifications remain within the scope of the present technology.

What is claimed is:
1. A pneumatic tire comprising:
a tread portion having a tread pattern;
a pair of bead portions; and
a pair of side portions provided on both sides of the tread portion, connecting the pair of bead portions to the tread portion, wherein
in each of half-tread regions on both sides in a tire width direction having a tire equator plane in the tread pattern interposed therebetween, the tread portion includes:
outer circumferential main grooves having a groove center position at a position separated from the tire equator plane by 30 to 35% of a tire ground contact width in a tire width direction and extending in the tire circumferential direction; and
at least one inner circumferential main groove provided between the outer circumferential main grooves and extending in the tire circumferential direction, and wherein
the outer circumferential main grooves are on outermost side in the tire width direction of all circumferential main grooves provided in the tread portion extending in the tire circumferential direction,
when a first arc shape formed to pass through an edge adjoining a tread surface on an inner side of each of the outer circumferential main grooves in the tire width direction and edges adjoining the tread surface on both sides of the inner circumferential main groove, the first arc shape having a center point of a circle positioned on the tire equator plane, is determined, and a second arc shape passing through an edge adjoining the tread surface on an outer side in the tire width direction of each of the outer circumferential main grooves and connected with the first arc shape so as to be in contact therewith on the outer circumferential main groove, is determined,
a radius of a circle of the second arc shape is within a range of 75 to 95% of a radius of a circle of the first arc shape,
a tread profile line of a first land portion positioned between the outer circumferential main grooves protrudes with respect to the first arc shape,
tread profile lines of second land portions on the outer side of the outer circumferential main grooves in the tire width direction all protrude with respect to the second arc shape,
a protruding amount of the first land portion with respect to the first arc shape and a protruding amount of the profile line of the second land portion with respect to the second arc shape are both not more than 1.0 mm,
a maximum protruding amount of the profile line of the first land portion is from 0.2 to 0.5 mm, and
a maximum protruding amount of the profile line of each second land portion is from 0.5 to 1.0 mm.
2. The pneumatic tire according to claim 1, wherein
the protruding amount of the profile line of each second land portion is increased further from the outer circumferential main grooves toward the outer side in the tire width direction, and the protruding amount is decreased after reaching a maximum protruding amount.
3. The pneumatic tire according to claim 2, wherein
the profile line of each second land portion extends up to a position separated from a position having the maximum protruding amount in the tire width direction toward the outer side in the tire width direction by 5 to 15% of a tire maximum width.
4. The pneumatic tire according to claim 1, wherein
of the outer circumferential main grooves, a groove width of a first outer circumferential main groove in the half-tread region on a first side, the first side being one side in a tread width direction centered on the tire equator plane is narrow compared to a groove width of a second outer circumferential main groove in a half-tread region on a second side, the second side being another side in the tread width direction, and wherein
for the protruding amount of the profile line of the second land portions, the protruding amount on the first side is large compared to the protruding amount on the second side.
5. The pneumatic tire according to claim 4, wherein
when mounting the pneumatic tire on a vehicle, a vehicle mounting orientation is specified for the pneumatic tire such that the first side is located on the outer side of the vehicle.
6. The pneumatic tire according to claim 5, wherein
the inner circumferential main groove is provided in each half-tread region, and the inner circumferential main groove has a groove center position at a position separated from the tire equator plane by 10 to 15% of the tire ground contact width in the tire width direction.

7. The pneumatic tire according to claim 6, wherein
of the outer circumferential grooves and inner circumferential grooves, when an outer circumferential main groove and an inner circumferential groove positioned adjacent to each other on one side in the tire width direction are set as a first circumferential main groove and a second circumferential main groove, a ratio $W_2/W_1$ of a groove width $W_2$ of the second circumferential main groove with respect to a groove width $W_1$ of the first circumferential main groove is from 4 to 5.

8. The pneumatic tire according to claim 7, wherein
of all of the circumferential main grooves provided in the tread portion and extending in the tire circumferential direction, the first circumferential main groove has a smallest groove width and the second circumferential main groove has a largest groove width.

9. The pneumatic tire according to claim 8, wherein
the first land portion has a center land portion crossed by the tire equator plane, and a tread profile line of the center land portion protrudes with respect to the first arc shape.

10. The pneumatic tire according to claim 1, wherein
of the outer circumferential main grooves, a groove width of a first outer circumferential main groove in the half-tread region on a first side, the first side being one side in a tread width direction centered on the tire equator plane is narrow compared to a groove width of a second outer circumferential main groove in a half-tread region on a second side, the second side being another side in the tread width direction, and wherein
for the protruding amount of the profile line of the second land portion, the protruding amount on the first side is large compared to the protruding amount on the second side.

11. The pneumatic tire according to claim 10, wherein
when mounting the pneumatic tire on a vehicle, a vehicle mounting orientation is specified for the pneumatic tire such that the first side is located on the outer side of the vehicle.

12. The pneumatic tire according to claim 1, wherein
the inner circumferential main grooves are provided in the respective half-tread regions, and the inner circumferential main grooves have a groove center position at a position separated from the tire equator plane by 10 to 15% of the tire ground contact width in the tire width direction.

13. The pneumatic tire according to claim 12, wherein
of the outer circumferential grooves and the inner circumferential grooves, when the outer circumferential main groove and the inner circumferential groove positioned adjacent to each other on one side in the tire width direction are set as a first circumferential main groove and a second circumferential main groove, a ratio $W_2/W_1$ of a groove width $W_2$ of the second circumferential main groove with respect to a groove width $W_1$ of the first circumferential main groove is from 4 to 5.

14. The pneumatic tire according to claim 13, wherein
of all of the circumferential main grooves provided in the tread portion and extending in the tire circumferential direction, the first circumferential main groove has a smallest groove width and the second circumferential main groove has a largest groove width.

15. The pneumatic tire according to claim 1, wherein
the first land portion has a center land portion crossed by the tire equator plane, and a tread profile line of the center land portion protrudes with respect to the first arc shape.

16. The pneumatic tire according to claim 1, wherein the maximum protruding amount of the profile line of the first land portion is from 0.2 to 0.4 mm.

17. The pneumatic tire according to claim 1, wherein the protruding amount of the profile line of each second land portion is greater than the protruding amount of the first land portion.

18. The pneumatic tire according to claim 13, wherein
of all of the circumferential main grooves provided in the tread portion and extending in the tire circumferential direction, the first circumferential main groove has a smallest groove width and the second circumferential main groove has a largest groove width, the second circumferential groove being a singular groove and all other of the circumferential main grooves having a smaller groove width than the largest groove width.

\* \* \* \* \*